Aug. 18, 1959     L. DANIEL     2,899,954
VALVE SPRING SHIM
Filed July 12, 1956
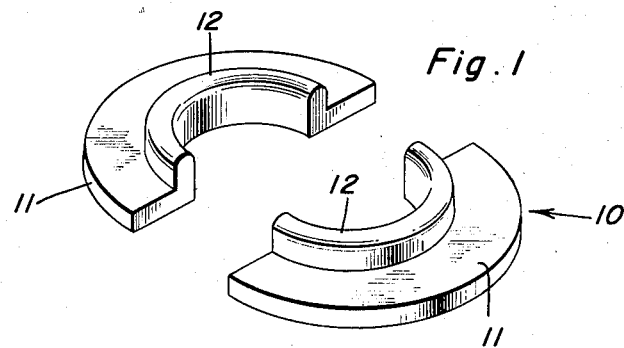
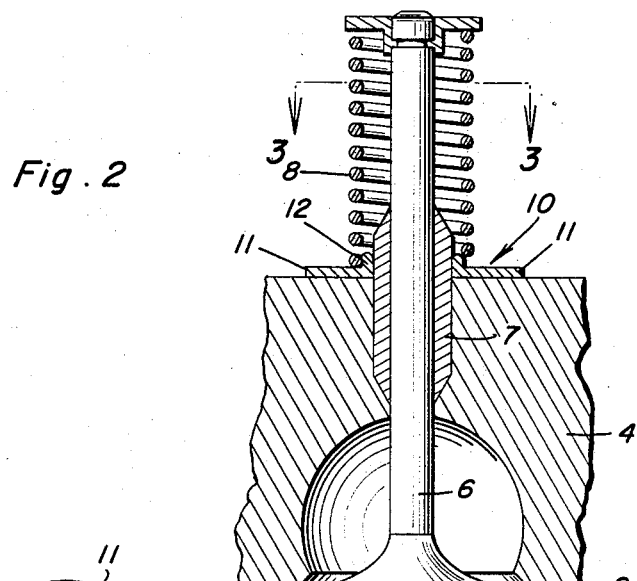
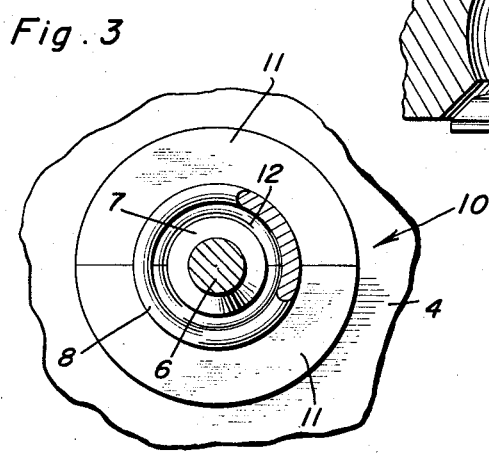
Luther Daniel
INVENTOR.
BY *Clarence A. O'Brien*
*and Harvey B. Jacobson*
Attorneys

2,899,954

VALVE SPRING SHIM

Luther Daniel, Oakfield, Tenn.

Application July 12, 1956, Serial No. 597,414

2 Claims. (Cl. 123—188)

The present invention relates to new and useful improvements in shims particularly for the valve springs of automobile engines and has for its primary object to provide, in a manner as hereinafter set forth, novel means for compressing and thus stiffening such springs.

Another very important object of the invention is to provide a shim of the aforementioned character which may be expeditiously installed or inserted without disturbing the valve, spring or valve mechanism.

Other objects of the invention are to provide a valve spring shim of the character described which will be comparatively simple in construction, strong, durable and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view of a valve spring shim constructed in accordance with the present invention, showing the parts separated;

Figure 2 is a vertical sectional view through a portion of an engine, showing the shim installed; and Figure 3 is a view in horizontal section, taken substantially on the line 3—3 of Figure 2.

Referring now to the drawing in detail, it will be seen that reference character 4 designates a portion of an automobile engine having mounted therein a conventional poppet valve 5. The stem 6 of the valve 5 is slidable in the usual guide 7. The coil spring 8 closes the valve 5 in the usual manner. Reference character 9 designates a seat for the valve 5.

The embodiment of the present invention which has been illustrated comprises a flat ring of suitable metal which is designated generally by reference character 10. The ring 10 is adapted to be mounted on the engine head 4 and encircle the guide 7 beneath the spring 8 for compressing and thus stiffening or tensioning said spring. Toward this end, the ring 10 comprises a pair of separate, complementary half-sections 11 adapted to be slipped beneath the valve spring 8 on diametrically opposite sides of the guide 7 and in a manner to encircle said guide. When thus mounted beneath the spring, the opposed ends of the complementary half-sections 11 of the ring 10 abut. Rising from the inner peripheral portion of the ring 10 is an annular flange 12 which is engageable in the spring 8 for retaining the half-sections 11 in position around the valve guide 7.

It is thought that the use of the shim will be readily apparent from a consideration of the foregoing. Briefly, should it be desired for any reason to tension or stiffen the valve spring 8, said spring is lifted in any suitable manner. The half-sections 11 of the ring 10 are then slipped beneath the lower end of the lifted spring 8 from diametrically opposite sides of the guides 7. With the half-sections 11 thus inserted the spring 8 is released and permitted to seat on the shim 10, the bottom coil of said spring encircling the flange 12. Of course, to remove the shim the foregoing procedure is substantially reversed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A valve mechanism for internal combustion engines comprising a valve stem, a valve spring encircling said stem, a valve spring shim disposed between one end of said valve spring and the surface of an engine block through which the valve stem extends, said valve spring shim comprising a flat, two-piece washer-like shim having a central circular opening formed therethrough, a circular flange extending upwardly from said shim and about said opening, said shim encircling said valve stem and said flange having its outer surface in contacting relation to the inner surface of said spring, each piece of said shim being generally semi-circular in shape with the flat ends of each disposed in end to end abutting relation, said shim being of sufficient thickness whereby when it is placed between said spring and said surface, said spring will be compressed by a predetermined amount thereby increasing the tension of said spring which may have become weakened from prolonged use.

2. A repair device for restoring the depleted tension of a weakened valve spring in a valve mechanism for internal combustion engines comprising a valve stem, a valve spring encircling said stem, a valve spring shim disposed between one end of said valve spring and the surface of an engine block through which the valve stem extends, said valve spring shim comprising a flat, two-piece washer-like shim having a central circular opening formed therethrough, a circular flange extending upwardly from said shim and about said opening, said shim encircling said valve stem and said flange having its outer surface in contacting relation to the inner surface of said spring, each piece of said shim being generally semi-circular in shape with the flat ends of each disposed in end to end abutting relation, said shim being of sufficient thickness whereby when it is placed between said spring and said surface, said spring will be compressed by a predetermined amount thereby restoring the depleted tension of the latter.

References Cited in the file of this patent

UNITED STATES PATENTS

| | | |
|---|---|---|
| 447,513 | Hamilton | Mar. 3, 1891 |
| 1,824,734 | Roos | Sept. 22, 1931 |
| 1,960,709 | Olenick | May 29, 1934 |
| 1,989,157 | Schmidt | Jan. 29, 1935 |
| 2,191,333 | Willgoos | Feb. 20, 1940 |
| 2,523,375 | Jones et al. | Sept. 26, 1950 |
| 2,694,391 | Ohly | Nov. 16, 1954 |

FOREIGN PATENTS

| | | |
|---|---|---|
| 528,739 | France | Aug. 24, 1921 |